June 20, 1933.  R. W. CUMMINGS  1,914,405
MACHINE FOR CUTTING BLANKS FROM SHEET MATERIAL
Filed Aug. 15, 1930
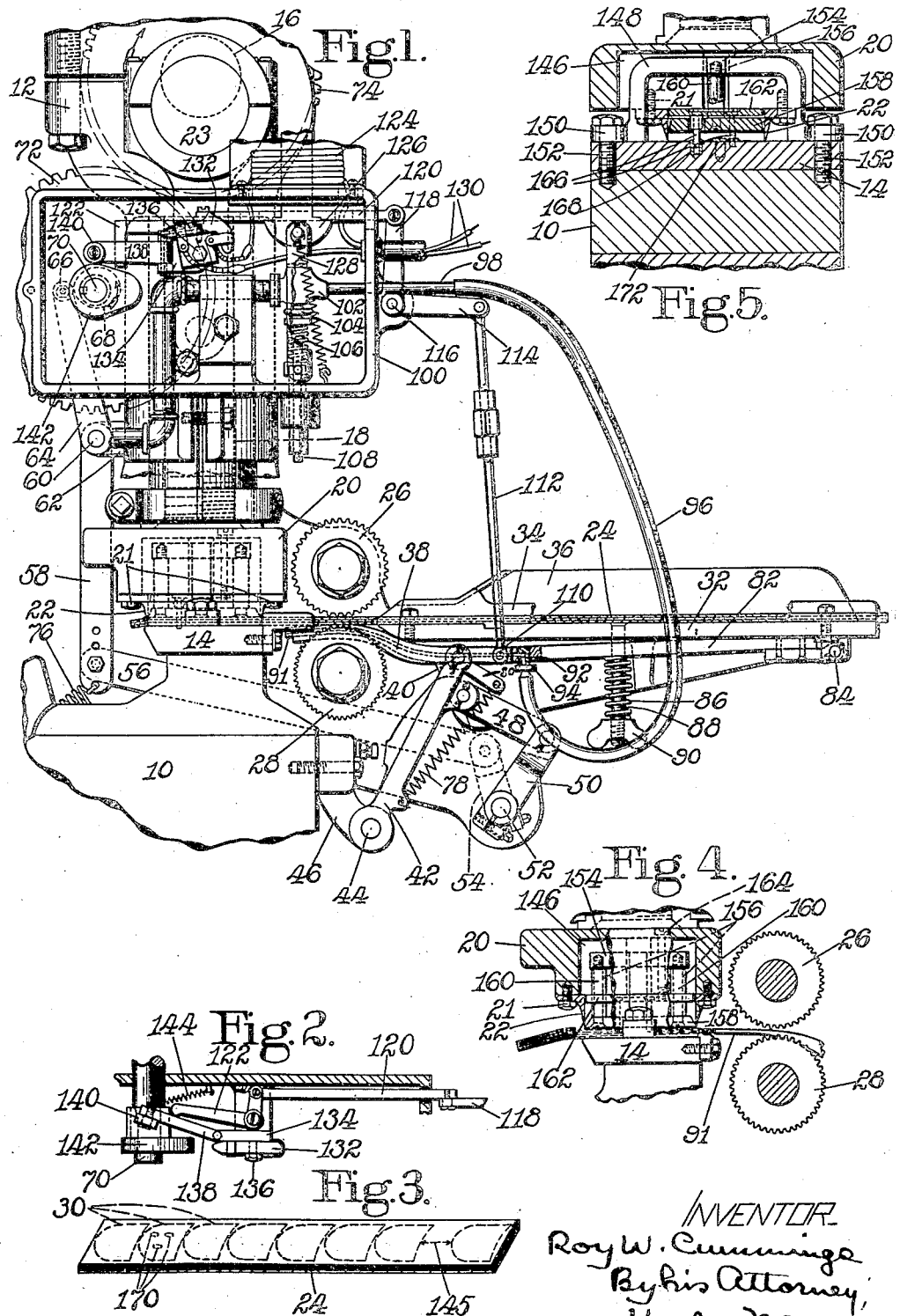

Patented June 20, 1933

1,914,405

UNITED STATES PATENT OFFICE

ROY W. CUMMINGS, OF BEVERLY, MASSACHUSETTS, ASSIGNOR TO UNITED SHOE MACHINERY CORPORATION, OF PATERSON, NEW JERSEY, A CORPORATION OF NEW JERSEY

MACHINE FOR CUTTING BLANKS FROM SHEET MATERIAL

Application filed August 15, 1930. Serial No. 475,580.

This invention relates to machines for cutting blanks from sheet material and is herein illustrated as embodied in a machine for producing wooden cores for rubber heels, such as heels of the type illustrated in United States Letters Patent No. 1,741,037, granted December 24, 1929 upon an application filed in the name of Clifford Roberts.

An object of the invention is to provide an improved machine of the type referred to which will be more rapid in its operation and more economical in the use of material. To this end, and as illustrated, the invention provides a cutting machine comprising a die, a cutting block, and feed mechanism for intermittently advancing a strip of material past the die, together with mechanism including a pneumatic device for insuring ejection of the last of a series of blanks died-out from the strip. The illustrated pneumatic device, which preferably comprises an air nozzle movable into alinement with the path of feed of the strip, is rendered operative subsequently to operation of the feed mechanism in advancing the last uncut portion of the strip to the die. The construction above set forth insures removal of the last blank of a series of blanks formed by cutting operations upon a strip and the removal of the waste at the end of the strip of material, thus preventing clogging of the die and associated parts, and making it possible for the operator to feed strips to the die in rapid succession without any likelihood of damaging the last blank cut from a strip or the forward end of a succeeding strip.

Another feature of the invention resides in a novel device for stripping blanks from the die. Preferably and as illustrated, this device comprises a stripper plate secured to the cutting block and positioned within the cutting edges of the die but so arranged that it does not interfere with the reciprocating movements of the die toward and away from the cutting block. By means of this construction the blanks die-out from the strip are removed from the die successively and can be advanced past the die by successive feed movements of the strip, the last blank and the waste accompanying it being removed by pneumatic means, as above set forth.

Other objects and features of the invention will appear from the following detailed description when taken in connection with the accompanying drawing and will be pointed out in the claims.

In the drawing,

Fig. 1 illustrates a side elevation of a portion of a core-punching machine constructed according to the invention;

Fig. 2 is a plan view, partly in section, of mechanism for operating the pneumatic ejecting device;

Fig. 3 is a perspective view of a strip of material, illustrating the manner in which blanks are cut therefrom;

Fig. 4 is a side view, partly in section, of the die-stripping device and the ejecting device; and Fig. 5 is a transverse sectional view through the die and cutting block and die-stripping device.

As shown in the drawing, the machine comprises a base 10 and a head 12 which respectively support a cutting block 14 and a main shaft 16. Secured to the shaft 16 is a plunger 18 having at its lower end a hollow die carrier 20 to which is secured by bolts 21 a heel-shaped die 22. The shaft 16 which is suitably driven by a fly-wheel (not shown) operates through an eccentric 23 to reciprocate the plunger 18 in effecting a series of operations upon strips of ply-wood, such as strip 24 (Fig. 3), which are intermittently advanced by feed rolls 26 and 28 to the die which is effective to produce a plurality of heel-shaped blanks or cores from each strip, as indicated by reference character 30. For further details of the construction and operation of the machine thus far described, including mechanism for driving the feed rolls (not shown in detail herein) reference may be had to Patent No. 1,291,726, granted January 21, 1919, upon an application filed in the name of W. C. Baxter.

Strips, such as strip 24, are guided to the feed rolls 26 and 28 by a plate 32 positioned at the same level as the upper surface of the cutting block 14 and by side plates 34 and 36 which are so positioned as to direct the advance of the strips in proper location relatively to the side edges of the die 22. The feed rolls 26 and 28 are spaced laterally from the rear cutting edge portion of the die 22 and consequently will not be effective to advance the rear end of a strip 24 to the die. To advance such end, additional feed mechanism is provided. This mechanism comprises a bifurcated pusher member 38 which is pivoted at 40 upon an oscillating support 42 fulcrumed at 44 upon a bracket 46 upon the side of the base 10, said support being oscillated to move the pusher member toward and away from the die 22 by connections leading to the main drive shaft 16. The connections for operating the pusher member comprise a link 48 pivotally connected at its respective ends to said support 42 and to an arm 50 upon a rock shaft 52 which extends to the rear of the machine, and is there provided with a second arm 54 connected by a link 56 with an arm 58 upon another rock shaft 60 carried by an extension 62 of the head 12. The rock shaft 60 is provided with a second arm 64 carrying a roll 66 bearing against a cam 68 secured to a shaft 70. The shaft 70 is driven by a gear 72 meshing with a gear 74 secured to the main shaft 16. A spring 76 connected to one end of the arm 58 and to the base 10 tends to hold the roll 66 in engagement with the cam 60 and to move the pusher member 38 in the direction to feed the strip toward the die. The cam 68 thus operates to move the member 38 positively in the direction of its return movement. Normally the member 38 is moved back and forth beneath the lower surface of a strip 24 as the latter is advanced to the die by the feed rolls 26 and 28 and is held upwardly against the strip by a spring 78 secured to the support 42 and connected to a projection 80 upon the member 38. However, when the rear end of the strip has been advanced past the feed rolls, the spring 78 is effective to raise the member 38 until it is in position behind the rear end of the strip. During the next rotation of the cam 68 the support 42 will be rotated about its pivot 44, and the pusher member 38 will be advanced through action of spring 76 to move the end of the strip into position upon the cutting block for operation by the die.

To assist in guiding the strip to the cutting block, there is provided a spring plate 82 pivotally secured at 84 to the plate 32. The plate 82 is forced upwardly by means of a spring 86 positioned upon a stud 88 and located below the plate 82. The tension of the spring can be regulated by a wing nut 90 carried by the stud 88. The nut is so adjusted that the plate 82 will normally be effective to bear against the lower surface of a strip 24 being advanced by the feed rolls 26 and 28 and to force the forward edge of the strip slightly above the edge of the cutting block.

The feed rolls intermittently advance a strip past the die which operates to produce a series of blanks therefrom. The small amount of scrap, principally at the sides of the strip, resulting from the dieing-out operations is thrown laterally off of the cutting block 14 by the action of the die or is pushed off of the forward end of the cutting block by the remaining uncut portion of the strip upon the next advance movement thereof.

The pneumatic device for removing the last blank of the series cut from the strip and for removing the waste remaining after the last blank is cut is, for convenience, associated with the spring plate 82. Accordingly, the plate is provided with a flattened forward end portion constituting a nozzle 91 having an air passage 92 extending rearwardly and terminating in a nipple 94 in the lower side of the plate. The passage 92 is connected to a suitable source of air supply by connections including a flexible tube 96 secured to the nipple 4 at one end and at the other end to a pipe 98 which is supported by bracket 100 upon the head 12. A blast of air is delivered to the passage 92 at the proper time under control of a check valve 102 having a valve stem 104 which is normally urged in position to close the valve by a spring 106 carried by a plunger 108 in the bracket 100. The valve is opened at such time as the spring plate 82 is in raised position with the nozzle 91 in alinement with the path of feed of the strip, thus to render the air blast effective in ejecting the rear end of the strip and such waste pieces as may be positioned upon the cutting block, as indicated in Fig. 4. To this end, mechanism is provided for operating the valve when the plate is permitted to rise, that is, when the rear end of the strip has been advanced beyond the nozzle 91. Pivotally connected to the plate 82 at 110 is a link 112 the other end of which is connected to one arm 114 of a bell-crank lever fulcrumed at 116 on the bracket 100. The other arm 118 of the lever has pivoted on it a link 120 operatively connected to a bell-crank 122 which actuates mechanism for controlling the air blast.

This mechanism comprises a solenoid 124 the plunger 126 of which is connected by links 128 to the plunger 108 for operating the needle valve 102. The solenoid is operated by an electric current conducted through wires 130. In the circuit is positioned a mercury switch 132 (Figs. 1 and 3) carried by a bracket 134 mounted for rotation about a pivot 136. The bracket 134 carries a swingable lever arm 138 having at its outer end a roll 140 adapted to engage a cam 142 keyed to the shaft 70. The lever arm 138 is normally held in inoperative position, that is, in a position in which it does not engage the cam 142, by a spring 144 which also normally operates to maintain the bracket 134 so tilted that the circuit through the switch is open. When the plate 82 and nozzle 91 are raised upon advance of the rear of a strip past the end of the nozzle, the various connections including the link 112 rotate the bell-crank 122 in a direction to move the lever 138 into such position that the roll 140 engages the cam 142. Thus, when the high part of the cam 142 is in engagement with the roll 140, the bracket 134 will be rotated in a clockwise direction and the mercury switch will be so tilted as to effect a closing of the circuit to operate the solenoid 124. This results in the opening of the valve 102 to permit the flow of air to nozzle 91 effective to eject from the vicinity of the die any material positioned upon the cutting block 14.

It is to be noted that the throw of the pusher member 38 is so adjusted as to advance the rear end of a strip being operated upon into such position that the greater part of the waste or surplus material, such as indicated by reference character 145 (Fig. 3), not necessary for the production of the last blank to be formed from the strip will be located beyond the cutting edges of the die. Consequently, the waste will not interfere with upward movement of the air nozzle 91 into position for ejecting both the waste and the last blank cut from the strip.

The mechanism for opening the valve 102 is so timed that air is supplied to the nozzle shortly after a blank is stripped from the die by a device which will now be described. The die carrier 20 is provided with a recess 146 which extends transversely of and beyond the die which is secured to the walls of the recess by the bolts 21. Located in this recess is a bracket 148 the upper portion of which extends above the die and the lower portion of which has lateral extensions 150 in engagement with the cutting block 14 and secured thereto by bolts 152. The upper portion of the bracket 148 carries a bar 154 extending longitudinally of the die. Depending from the ends of the bar are studs 156 which support a stripper plate 158 which is spaced from the bar by thimbles 160 through which the screws 156 extend. The stripper plate 158 is heel-shaped and is slightly smaller than the die within which it fits. The plate is supported by the bar 154 in such a way that it is parallel to the cutting block 14 and spaced from it by a distance which is slightly greater than the thickness of the strip of material to be operated upon. The bracket 148 and the bar 154, being received in the recess 146, do not interfere with the operation of the die since the upper portions of these members are slightly spaced from the die carrier 20 when the plunger 18 is in its lowermost position, and the sides of the bracket 148 extend upwardly a greater distance than the stroke of the plunger so that the portions of the carrier to which the die is secured will not engage the under side of the bracket or bar. The stripper plate 158, being stationary with respect to the cutting block 14, will prevent movement of a blank cut by the die in an upward direction, and, as the die moves upwardly relatively to the stripper plate, the latter will force the blank out of the die.

In shaping the cores of rubber heels, it is desirable, at the same time as the marginal edges are formed, to punch the cores to produce a plurality of holes therein which will be effective when the cores are placed in rubber-heel molds to locate them upon gage pins of such molds. Accordingly, the illustrated machine is provided with a punch plate 162 (Figs. 4 and 5) which is located within the die 22 and is secured to the lower face of the die carrier 20 by means of bolts one of which is indicated by reference character 164 (Fig. 4). As shown in Fig. 4, the plate is cut away to permit passage therethrough of the thimbles 160 which form part of the supporting structure for the stripper plate 158. Secured to the plate 162 are a plurality of punches 166 extending downwardly through the stripper plate 158 with their ends below the plane of the cutting edges of the die 22. These punches co-operate with female members 168 located in the cutting block 14 to punch holes in the strip material simultaneously with the operation of the die 22 in forming the periphery of the blanks. The position of these holes relatively to the outlines of the blanks indicated in Fig. 3 is shown by reference character 170.

To provide for the stamping of size markings upon the blanks, the upper surface of the cutting block 14 is provided with a small die 172 (Fig. 5) which, under the pressure exerted by the die 22 and the punches 166 in operating upon a strip, will impress indicia upon the lower surface of each blank as it is formed by the die.

In the use of the machine the operator moves a strip of material, such as strip 24, over the plate 32 to the feed rolls 26 and 28 which are operated intermittently to advance the strip past the cutting block 14 with successive portions of the strip in position to be operated upon by the die 22. The die 22 is reciprocated to cut from the strip a series of heel-shaped blanks. As the die moves away from the cutting block after each cutting operation, the stationary stripper plate 158 prevents the cut blank from being moved upwardly with the die, and upon the next feed movement of the strip the cut blank and scrap resulting from the cutting operation are moved outwardly across the face of the cutting block. Operations upon the strip are continued until the feed rolls are no longer effective in feeding the strip over the cutting block, at which time the pusher member 38 will be forced upwardly by the spring 78 into position behind the end of the strip, and during the next rotation of the cam 68 the support 42 and consequently the pusher member 38 will be rotated about the pivot 44 to advance the end of the strip into position to be operated upon by the die. Shortly after the raising of the member 38 the plate 82 will be raised by the spring 86, and the air nozzle 91 will be positioned in alinement with the end of the strip. As the plate 82 is raised, the link 112 and its associated mechanism will effect movement of the lever 138 to bring the roll 140 into engagement with the cam 142 which upon rotation of the shaft 70 will rotate the bracket 134 in a clockwise direction, thus to close the electrical circuit through the mercury switch 132, thereby energizing the solenoid 124 which operates to raise the valve stem 106 permitting a blast of air to pass through the pipe 98 and connection 96 to the passage 92. The timing of the cams 68 and 142 is such that a blast of air is emitted from the passage 92 immediately after the blank formed by the cutting operation upon the end of the strip has been stripped from the die. This results in the removal from the cutting block of the last blank cut and any scrap remaining from the cutting operations upon the strip. Since the last blank cut from each strip is removed shortly after it is formed, there is no danger of its interfering with operations upon a succeeding strip or of its being damaged by subsequent operations of the die. Thus it will be seen that the invention provides an effective means for eliminating pieces of material from the vicinity of the cutting block and die, making it possible to feed strips to the machine very rapidly without any likelihood of clogging the machine.

Having described my invention, what I claim as new and desire to secure by Letters Patent of the United States is:—

1. A machine for cutting blanks from sheet material, comprising a die, a cutting block, feed mechanism for advancing a strip of sheet material past the die, means for causing relative movements between the die and block to produce a series of blanks, and a pneumatic device operable subsequently to operation of the feed mechanism in advancing the rear end of the strip to the die for removing from the machine pieces of material remaining after the last blank is cut from the strip.

2. A machine for cutting blanks from sheet material, comprising a cutting block, a die movable toward and away from the cutting block for cutting blanks from strips of sheet material, feed rolls for advancing a strip of material to the die, feed mechanism for advancing the rear end of the strip to the die, and pneumatic means operated in timed relation to the feed mechanism to remove from the cutting block the material remaining after the last cutting operation upon the strip.

3. A machine for cutting blanks from sheet material, comprising a cutting block, a die movable toward and away from the cutting block for cutting blanks from strips of sheet material, feed rolls for advancing a strip of material to the die, feed mechanism for advancing the rear end of the strip to the die, and pneumatic means operable to remove from the cutting block the material remaining after the last cutting operation upon the strip.

4. In a machine for operating upon sheet material, a cutting block, a die movable toward and away from the cutting block, feeding mechanism for advancing a strip of material into position to be operated upon by the die, and means for removing pieces of material remaining after a cutting operation upon the strip comprising an air nozzle movable into the line of feed of the material subsequently to the operation of the feeding mechanism in locating the strip relatively to the die.

5. A machine for operating upon sheet material, comprising a cutting block, a die, feed mechanism for advancing a strip past the die and cutting block, an air nozzle movable into the path of advance of the strip, and means operated subsequently to the last cutting operation upon the strip for causing a blast of air to pass through the nozzle to eject pieces of material resulting from the cutting operation.

6. A machine for operating upon sheet material, comprising a die, a cutting block, feeding mechanism for advancing a strip of sheet material past the die, means for causing relative movement between the die and block to produce a cutting operation upon the strip, an air nozzle for removing from the vicinity of the die and cutting block pieces of material resulting from the cutting operations, means for moving the air nozzle into alinement with the path of advance of the strip, and means operable in timed relation to the final cutting operation upon the strip to force a blast of air through the nozzle.

7. In a machine for operating upon sheet material, a cutting block, means for advancing a strip of sheet material across the cutting block, a rotary shaft, a plunger carried by the shaft and mounted for movement toward and away from the cutting block, a die carried by the plunger for co-operating with the cutting block to cut blanks from a strip of material, an air nozzle located in proximity to the die and cutting block but normally positioned out of the path of advance of the strip, means for advancing the rear end of the strip to the die, said advancing means being operable in timed relation to the operation of the plunger in effecting a cutting operation of the die, means operable to move the air nozzle into alinement with the rear end of the strip, an air supply, a valve controlling the air supply, and means operatively connected to the shaft to open the valve.

8. A machine for operating upon sheet material, comprising a die, a cutting block, means for feeding sheet material into operative position between the die and the cutting block, means for causing relative movement of the die and cutting block to produce a blank from the material, and an air nozzle movable into the path of advance of the material for ejecting from the machine in the direction of said path of advance pieces of material resulting from the operation of the die.

9. A machine for operating upon sheet material, comprising a die, a cutting block, means for advancing sheet material into operative position between the die and block, means for producing relative movement of the die and block to cause the die to cut a blank from the material, means for stripping the blank from the die, an air nozzle mounted adjacent to the die, and means operable after an operation of the stripping means for moving the air nozzle from inoperative position into position for ejecting the blank in the direction of the path of advance of the material.

10. A machine for operating upon sheet material, comprising a die, a cutting block, means for advancing sheet material into operative position between the die and block, means for producing relative movement of the die and block to cause the die to cut a blank from the material, means for stripping the blank from the die, an air nozzle located at one side of the die and movable from an inoperative position into the path of advance of the material in position for ejecting the blank from the machine, and means for controlling a blast of air through the nozzle operable automatically subsequently to the operation of the stripping means.

11. A machine for cutting sheet material, comprising a cutting block, a plunger, a hollow die carrier secured to the plunger, a die mounted upon the carrier, a bracket secured to the cutting block and extending into the die carrier, and a stripper plate supported by the bracket within the die and at a predetermined distance from the cutting block.

12. A machine for operating upon sheet material, comprising a cutting block, a die movable toward and away from the cutting block, means for operating the die comprising a hollow carrier, means for stripping cut blanks from the die comprising a plate located within the die, and means secured to the cutting block and extending into the carrier for supporting the plate at a fixed distance from the cutting block.

13. A machine for operating upon sheet material, comprising a hollow die, a cutting block, means for causing relative movement between the die and cutting block to produce a cutting operation upon sheet material, and means for stripping blanks from the die comprising a plate located within the die and secured to the cutting block.

14. A machine for operating upon sheet material, comprising a die, a cutting block, means for causing relative movement between the die and cutting block to produce blanks from sheet material, a stripper plate located within the die and secured in fixed position relatively to the cutting block for ejecting a blank from the die upon relative movement between the die and cutting block subsequently to a cutting operation.

15. A machine for operating upon sheet material, comprising a die, a cutting block, means for causing relative movement between the die and cutting block for dieing-out a blank from material presented to the die, a stripper plate located within the die and fixedly secured to the cutting block, and a punch located within the die and extending through the stripper plate for punching a hole in the material simultaneously with the formation of the blank.

16. A machine for operating upon sheet material, comprising a die, a cutting block, means for advancing a strip of sheet material toward the die, means for causing relative movements between the die and the block to effect the dieing-out of blanks from the material, an air nozzle normally located out of the path of advance of the strip, and means operable when the rear end of the strip is advanced into proximity to the die for moving the air nozzle into alinement with the path of advance of the strip.

17. A machine for operating upon sheet material, comprising a die, a cutting block, means for advancing a strip of sheet material toward the die, means for causing relative movements between the die and the block to effect the dieing-out of blanks from the material, an air nozzle normally located out of the path of advance of the strip, means for effecting movement of the air nozzle into alinement with the path of advance of the strip, and means operable automatically subsequent to such movement for delivering a blast of air to the nozzle.

18. A machine for operating upon sheet material, comprising a die and a cutting block arranged for movement relatively to each other for producing blanks from a strip of sheet material advanced between them, an air nozzle for ejecting pieces of material formed by the operations of the die and movable relatively to the die and block, a valve for controlling the supply of air to the nozzle, a solenoid for controlling the valve, and means for controlling the solenoid in response to movements of the air nozzle.

In testimony whereof I have signed my name to this specification.

ROY W. CUMMINGS.